US008386580B1

(12) United States Patent
Thomas

(10) Patent No.: US 8,386,580 B1
(45) Date of Patent: Feb. 26, 2013

(54) SHARED BUFFER FOR DATA COMMUNICATIONS ROUTED THROUGH HUB

(75) Inventor: Christopher Thomas, San Diego, CA (US)

(73) Assignee: SMSC Holdings S.a.r.l., Luxembourg (LU)

( * ) Notice: Subject to any disclaimer, the term of this patent is extended or adjusted under 35 U.S.C. 154(b) by 685 days.

(21) Appl. No.: 12/573,019

(22) Filed: Oct. 2, 2009

(51) Int. Cl.
G06F 15/167 (2006.01)
G06F 3/00 (2006.01)

(52) U.S. Cl. ........... 709/213; 709/215; 709/216; 710/52
(58) Field of Classification Search .................. 709/212, 709/213
See application file for complete search history.

(56) References Cited

U.S. PATENT DOCUMENTS

| 4,491,909 | A | * | 1/1985 | Shimizu | 711/147 |
| 7,124,235 | B2 | * | 10/2006 | Lee et al. | 710/316 |
| 7,698,424 | B1 | * | 4/2010 | Clark et al. | 709/225 |
| 2006/0059293 | A1 | * | 3/2006 | Wurzburg et al. | 710/313 |
| 2008/0082699 | A1 | * | 4/2008 | Alrod et al. | 710/2 |
| 2009/0100209 | A1 | * | 4/2009 | Szabelski | 710/313 |
| 2009/0292838 | A1 | * | 11/2009 | Wong | 710/52 |
| 2011/0010721 | A1 | * | 1/2011 | Gupta et al. | 718/103 |

* cited by examiner

Primary Examiner — Djenane Bayard

(57) ABSTRACT

Various techniques are provided for selectively allocating a buffer adapted to be shared for storage media device data communications and downstream device data communications routed through a hub. For example, in one embodiment, a method includes detecting if one or more downstream devices are connected to one or more downstream device ports of the hub. The method also includes, if any downstream devices are detected: allocating a first portion of the buffer for a storage media device controller, allocating one or more second portions of the buffer for the detected downstream devices, wherein each of the second portions is associated with a corresponding one of the detected downstream devices, and passing the storage media device data communications between a host device and the storage media device controller through the first portion of the buffer and not the second portions of the buffer.

31 Claims, 2 Drawing Sheets

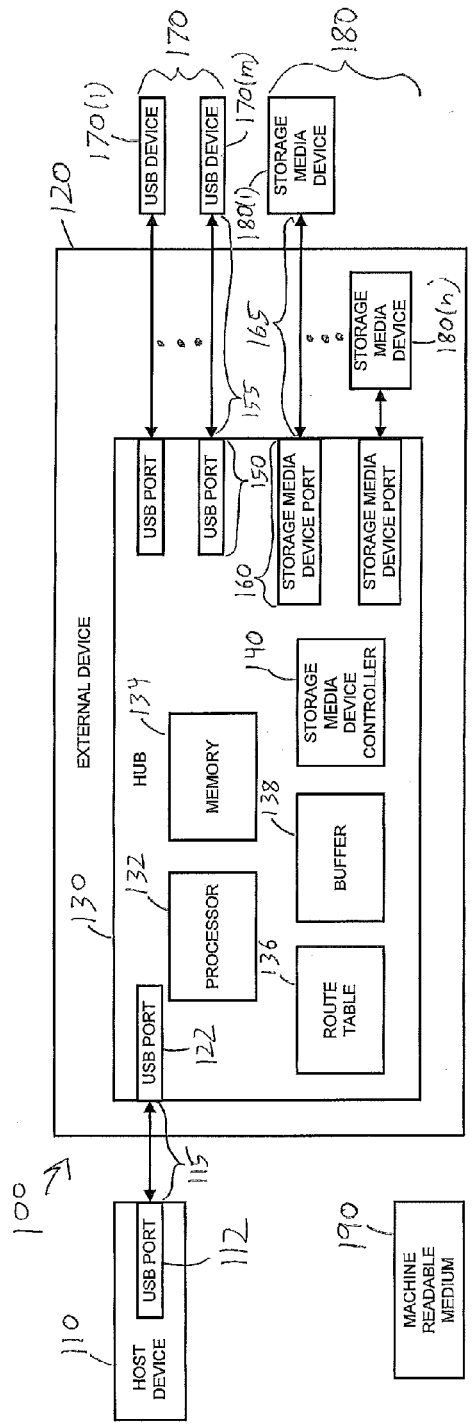
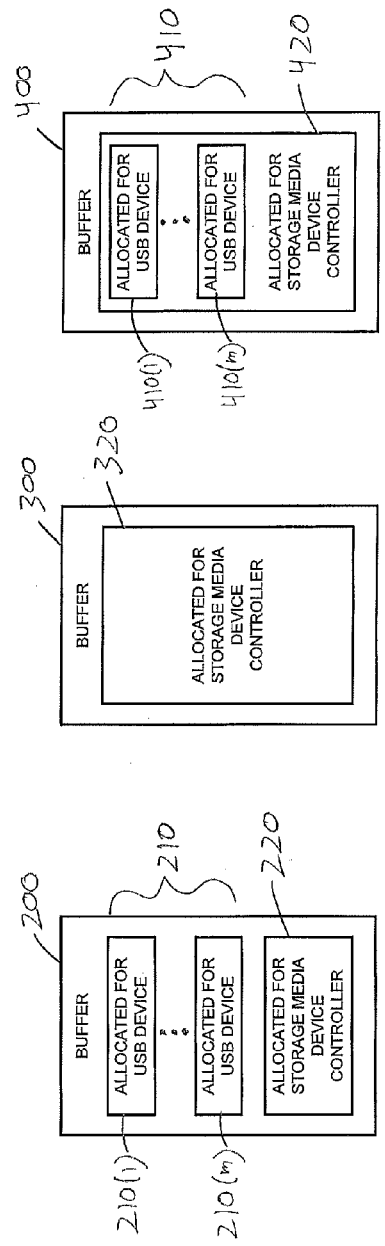

SHARED BUFFER FOR DATA COMMUNICATIONS ROUTED THROUGH HUB

BACKGROUND

1. Field of the Invention

The present invention generally relates to the interfacing of external devices with host devices and, more particularly, to the buffering of data transferred between such devices.

2. Related Art

As is well known, various types of interfaces may be used to facilitate data communication between host devices (e.g., computers or other devices) and external devices (e.g., hard drives or other devices). In particular, Universal Serial Bus (USB) ports have become a common way to attach hard drives and other types of external storage media devices to host computer systems with high performance.

The number of available USB ports is often a limiting factor in host computers. Because USB is a point-to-point master/slave bus, USB-compatible devices typically include only a single USB port. Thus, if users connect several storage media devices or other devices, the USB ports of the host computer may be quickly exhausted.

One approach to this problem involves the use of a USB hub which may be connected to a single USB port of the host computer to provide additional USB ports. Conventional USB hubs, and particularly hubs supporting the USB 3.0 specification, typically provide at least one dedicated data buffer for each port. For example, a USB hub providing four USB ports may include four data buffers. Typically, these data buffers are relatively small in size (e.g., approximately 10 kbits).

To connect an external storage media device to a USB port and achieve a high level of performance, it is typically necessary to provide a storage media device controller and an associated data buffer that is significantly larger (e.g., approximately 32 kbits) than conventional USB data buffers. However, an arrangement that includes both a conventional USB hub and a conventional storage media device controller may result in undesirable latency for storage media device data communications. In this regard, data communications passed from the host device to the USB hub are buffered by the USB hub data buffer. The data communications are then passed from the USB hub to the storage media device controller wherein they are further buffered by the storage media device controller data buffer. Similarly, data communications passed from storage media devices are buffered by the storage media device controller data buffer and then further buffered by the USB hub data buffer before being received by the host device.

Consequently, data throughput between the host device and storage media devices may suffer when the storage media device is connected through a USB hub. Such problems may be especially apparent when the USB hub is used for high speed data transfers, such as data communications between a host computer and storage media devices connected to USB ports of the USB hub. Additionally, the buffer in the hub and the buffer in the storage media device controller are a duplication of resources, which results in a higher cost. Accordingly, there is a need for an improved approach for interfacing various devices with host devices.

SUMMARY

Various techniques are provided for selectively allocating a buffer adapted to be shared for storage media device data communications and downstream device data communications routed through a hub. For example, in one embodiment, a method of selectively allocating a buffer adapted to be shared for storage media device data communications and downstream device data communications routed through a hub includes detecting if one or more downstream devices are connected to one or more downstream device ports of the hub; and if any downstream devices are detected: allocating a first portion of the buffer for a storage media device controller, allocating one or more second portions of the buffer for the detected downstream devices, wherein each of the second portions is associated with a corresponding one of the detected downstream devices, and passing the storage media device data communications between a host device and the storage media device controller through the first portion of the buffer and not the second portions of the buffer.

In another embodiment, a device includes a host device port adapted to interface with a host device; one or more downstream device ports adapted to interface with one or more downstream devices; a storage media device controller; a hub; and a buffer adapted to be shared for storage media device data communications and downstream device data communications routed through the hub, wherein the hub is adapted to: detect if one or more downstream devices are connected to the one or more downstream device ports, and if any downstream devices are detected, allocate a first portion of the buffer for the storage media device controller, allocate one or more second portions of the buffer for the detected downstream devices, wherein each of the second portions is associated with a corresponding one of the detected downstream devices, and pass the storage media device data communications between the host device and the storage media device controller through the first portion of the buffer and not the second portions of the buffer.

In another embodiment, a device includes a host device port adapted to interface with a host device; one or more downstream device ports adapted to interface with one or more downstream devices; a storage media device controller; a buffer adapted to be shared for storage media device data communications and downstream device data communications; means for detecting if one or more downstream devices are connected to the one or more downstream device ports; means for allocating a first portion of the buffer for the storage media device controller; means for allocating one or more second portions of the buffer for the detected downstream devices, wherein each of the second portions is associated with a corresponding one of the detected downstream devices, and means for passing the storage media device data communications between a host device and the storage media device controller through the first portion of the buffer and not the second portions of the buffer.

In another embodiment, a device includes a host device port adapted to interface with a host device; a storage media device; one or more downstream device ports adapted to interface with one or more downstream devices; and a hub adapted to pass downstream device data communications between the host device and the downstream devices.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

FIG. 1 illustrates a system including a host device and an external device in accordance with an embodiment of the invention.

FIGS. 2-4 illustrate buffers in accordance with embodiments of the invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 5:
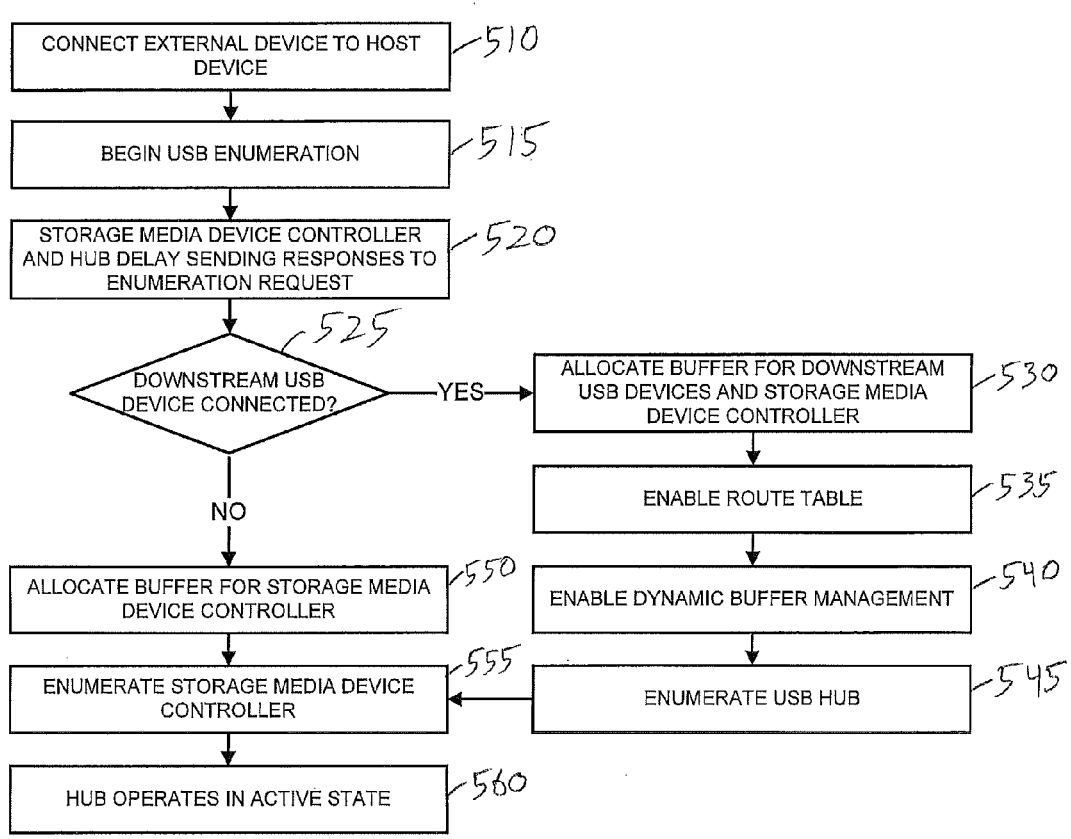
FIG. 5 illustrates a process of selectively configuring a hub to support the interfacing of various devices with a host device in accordance with an embodiment of the invention.

In accordance with embodiments further discussed herein, various techniques are provided for selectively allocating a buffer adapted to be shared for storage media device data communications and downstream device data communications routed through a hub. For example, a hub may be integrated with a storage media device controller and provided in an external storage media device enclosure that may be used to interface a host device with storage media devices and/or other devices connected to ports of the hub. Advantageously, the hub may include a shared buffer that may be selectively configured to buffer data for storage media devices and/or other devices. The use of a shared buffer may provide reduced latency in the transfer of data between the host device and devices connected to ports of the hub. These and other embodiments are further described herein with reference to storage media device enclosures. However, these techniques may be applied to any type of external device as may be appropriate in particular embodiments.

Referring now to the drawings which are provided for purposes of illustrating embodiments of the invention, and not for purposes of limiting the same, FIG. 1 illustrates a system 100 including a host device 110 and an external device 120 in accordance with an embodiment of the invention. Host device 110 may be implemented, for example, by a programmable computer system, dedicated hardware, or other configurations. External device 120 may be implemented, for example as a storage media device enclosure with a hub 130 or other configurations.

Host device 110 may be configured to interface with external device 120 through host device ports 112 and 122 over a bus 115. In this embodiment, host device ports 112/122 and bus 115 are implemented in accordance with USB 3.0 interface standards. In other embodiments, these components may be implemented in accordance with other interfaces such as, for example, USB 2.0, Firewire (e.g., IEEE 1394), or others.

Hub 130 which may be implemented to support a plurality of USB ports 150 and a plurality of storage media device ports 160. In this regard, hub 130 may support communications between host device 110 and a plurality of downstream USB devices 170 through ports 150 and busses 155. In this embodiment, ports 150, buses 155, and devices 170 are implemented in accordance with USB 3.0 interface standards. In other embodiments, these components may be implemented in accordance with other interfaces such as, for example, USB 2.0, Firewire, or others.

Hub 130 may also support communications between host device 110 and a plurality of storage media devices 180 through storage media device ports 160 and busses 165. Such storage media devices 180 may include, for example, hard drives, flash drives (e.g., thumb drives, solid state drives, or others), optical storage media (e.g., CD-ROM, DVD, HD-DVD, Blu-Ray, or others), or any other appropriate storage media devices. For example, in several embodiments, storage media device ports 160 and busses 165 may be connected with storage media devices 180 in accordance with Serial Advanced Technology Attachment (SATA) interfaces, external SATA (eSATA) interfaces, Parallel Advanced Technology Attachment (PATA) interfaces, flash memory interfaces, or others.

Storage media devices 180 may include one or more storage media devices 180(1) external to device 120, and may further include one or more storage media devices 180(n) internal to device 120. In one embodiment, device 120 may be implemented as a storage media device enclosure (e.g., a hard drive enclosure or an enclosure supporting one or more types of storage media devices) including one or more internal storage media devices 180(n). Such internal storage media devices 180(n) may be implemented, for example, as removable storage media devices or fixed storage media devices. Advantageously, the use of internal storage media devices 180(n) may reduce the number of cables (e.g., eSATA cables or other types of cables used to connect storage media devices 180) used by system 100.

As shown in FIG. 1, hub 130 includes a processor 132, a memory 134, a route table 136, a buffer 138, and a storage media device controller 140. In the embodiment shown in FIG. 1, storage media device controller 140 is integrated with hub 130. As a result, storage media device controller 140 may share the resources of other components of hub 130, and materials costs (e.g., silicon costs) may be reduced in comparison with other embodiments in which storage media device controller 140 is not integrated with hub 130. Processor 132 may be configured with appropriate software (e.g., a computer program for execution by processor 132) that is stored on a machine readable medium 190 (e.g., a CD-ROM or other appropriate storage media) and/or in memory 134 to instruct processor 132 to perform one or more of the operations described herein with regard to hub 130.

Route table 136 may be used to route, communications between host device 110 and one or more USB devices 170 through hub 130. In this regard, route table 136 may be populated by processor 132 with various device identifiers associated with USB devices 170 to route such communications. Storage media device controller 140 may support data communications between host device 110 and storage media devices 180.

Buffer 138 may be implemented as a shared buffer that may be selectively allocated to buffer data for USB devices 170 and/or storage media devices 180. For example, in one embodiment, portions of buffer 138 may be allocated for USB devices 170 to buffer data communications between host device 110 and USB devices 170, and other portions of buffer 138 may be allocated for storage media device controller 140 to buffer data communications between host device 110 and storage media devices 180 (e.g., which communicate with host device 110 through storage media device controller 140). In another embodiment, the entirety of buffer 138 may be allocated for storage media device controller 140.

Data communications between host device 110 and storage media devices 180 may be passed through buffer 138 without being further buffered by conventional USB data buffers in hub 130. As a result, high data throughput between host device 110 and storage media devices 180 may be maintained without suffering excessive latency associated with conventional USB data buffers.

FIGS. 2-4 illustrate buffers 200, 300, and 400 which may, for example, be used to implement buffer 138 of hub 130 in various embodiments. As shown in FIG. 2, buffer 200 has been configured with portions 210 allocated for USB devices 170. For example, a portion 210(1) has been allocated for data communications between host device 110 and USB device 170(1), and a portion 210(m) has been allocated for data communications between host device 110 and USB device 170(m). In addition, a portion 220 has been allocated for storage media device controller 140.

As shown in FIG. 3, buffer 300 has been configured with a portion 320 allocated for storage media device controller 140. In this embodiment, portion 320 corresponds to substantially all of buffer 300.

As shown in FIG. 4, buffer 400 has been configured with portions 410 allocated for USB devices 170. For example, a portion 410(1) has been allocated for data communications between host device 110 and USB device 170(1), and a portion 410(m) has been allocated for data communications between host device 110 and USB device 170(m). In addition, a portion 420 corresponding to substantially all of buffer 400 has been allocated for storage media device controller 140. As shown in FIG. 4, one or more of the allocated portions of buffer 400 may overlap with each other. In this regard, buffer 400 may be managed dynamically to switch the operation of buffer 400 such that the same memory locations in buffer 400 may be used for different purposes at different times. For example, when hub 130 is passing data communications between host device 110 and USB devices 170, then the allocations corresponding to portions 410 may be used. At a different time when hub 130 is passing data communications between host device 110 and storage media devices 180, then the operation of buffer 400 may be switched such that the allocation corresponding to portion 420 may be used. As a result, substantially all of buffer 400 may be used for storage media device data communications without interfering with USB device data communications occurring at other times. The allocations of various portions of buffers 200, 300, and 400 may be further understood with reference to the process of FIG. 5.

FIG. 5 illustrates a process of selectively configuring hub 130 to support the interfacing of USB devices 170 and storage media devices 180 with host device 110 in accordance with an embodiment of the invention.

In step 510, external device 120 is connected to host device 110 by bus 115. For example, in one embodiment, an appropriate interface cable may be connected between host device 112 and 122 to provide bus 115.

In step 515, host device 110 begins a USB enumeration process in order to register any connected devices with host device 110. For example, host device 110 may issue an enumeration request to external device 120 during step 515. As further described herein, hub 130 and storage media device controller 140 may be recognized as separate devices and may be separately registered (e.g., enumerated) with host device 110 at different times.

In step 520, hub 130 and storage media device controller 140 delay sending responses to the enumeration request of step 515. In this regard, such responses may be selectively sent by hub 130 and/or storage media device controller 140 based on the results of further steps performed during the process of FIG. 5.

In step 525, hub 130 determines (e.g., detects) whether one or more USB devices 170 are connected to USB ports 150. If one or more USB devices 170 are connected, then the process continues to steps 530-545. Otherwise, the process continues to step 550.

In step 530 (e.g., performed if one or more USB devices 170 were detected in step 525), hub 130 allocates one or more portions of buffer 138 for the connected USB devices 170 and also allocates one or more portions of buffer 138 for storage media device controller 140. For example, in one embodiment, hub 130 may allocate one or more of portions 210 and 220 shown in FIG. 2 corresponding to one or more of USB devices 170 and storage media devices 180. In another embodiment, hub 130 may allocate one or more of portions 410 and 420 shown in FIG. 4 corresponding to one or more of USB devices 170 and storage media devices 180 (e.g., in an embodiment where dynamic buffer management is used).

In step 535, hub 130 enables route table 136. In this regard, hub 130 may populate route table 136 with appropriate identifiers associated with USB devices 170 for routing data communications between host device 110 and USB devices 170.

In step 540, hub 130 may enable dynamic buffer management. If enabled, such dynamic buffer management may permit buffer 138 to be used in a similar manner as described with regard to buffer 400 if desired. For example, overlapping locations of buffer 138 may be used for different allocated portions of buffer 138 as described. As a result, when hub 130 operates in an active state (e.g., in step 460), hub 130 may dynamically switch between operating buffer 138 in accordance with different allocations (e.g., when hub 130 is passing data communications between host device 110 and USB devices 170 then the allocations corresponding to portions 410 may be used, and at a different time when hub 130 is passing data communications between host device 110 and storage media devices 180 then the allocation corresponding to portion 420 may be used).

In step 545, hub 130 is enumerated to host device 110. For example, in one embodiment, hub 130 may send a response to host device 110 in reply to the enumeration request issued in step 515. As a result, host device 110 may register hub 130 as a device connected over bus 115.

In step 550 (e.g., performed if no USB devices 170 were detected in step 525), hub 130 allocates substantially all of buffer 138 for storage media device controller 140. For example, in one embodiment, hub 130 may allocate portion 320 shown in FIG. 3.

In step 555 (e.g., performed whether or not any USB devices 170 were detected in step 525), storage media device controller 140 is enumerated to host device 110. For example, in one embodiment, storage media device controller 140 may send a response to host device 110 in reply to the enumeration request issued in step 515. As a result, host device 110 may register storage media device controller 140 as a device connected over bus 115.

In step 560, hub 130 operates in an active state in accordance with the allocations made to buffer 138. In one case, if one or more downstream USB devices 170 are connected to hub 130, then various portions of buffer 138 (e.g., portions 210) may be allocated to support USB devices 170, and other portions (e.g., portion 220) may be allocated to support storage media device controller 140 (e.g., in accordance with dynamic buffer management or otherwise). In another case, no downstream USB devices 170 are connected to hub 130, then substantially all of buffer 138 (e.g., portion 320) may be allocated to support storage media device controller 140.

In either case, data communications between host 110 and storage media devices 180 may be passed through buffer 138 without being further buffered by conventional USB data buffers. Thus, even if USB devices 170 are connected to hub 130, data communications for such devices may be buffered by portions of buffer 138 different from the portions used to buffer data communications for storage media device controller 140. As a result, high data throughput between host device 110 and storage media devices 180 may be maintained without suffering excessive latency associated with conventional USB data buffers.

Advantageously, the use of external device 120 permits storage media device data communications to be routed between host device 110 and multiple storage media devices 180 without using more than one USB port (e.g., host port 112) of host device 110. For example, multiple external devices 120 may be daisy chained together such that host ports 122 of additional external devices 120 may be connected to USB ports 150 of other external devices 120. If such external devices 120 are implemented as external storage media device enclosures including internal storage media devices 180(n), then such an arrangement may permit a user to conveniently connect large numbers of storage media devices to host device 110 through short or long USB cables as may be desired in particular applications.

Other embodiments are also contemplated which may leverage the ability of hub 130 to know the types of devices and/or storage media devices connected to USB ports 150 and/or storage media device ports 160, and the ability of hub 130 to control data communications through such ports. In one embodiment, appropriate operations may be performed by processor 132, memory 134, and/or storage media device controller 140 to treat one or more of storage media devices 180 as extensions of each other such that host device 110 perceives storage media devices 180 as a single storage media device. For example, storage media devices 180(1) and 180(n) may be configured as a RAID array to provide larger capacity and/or redundancy.

In another embodiment, appropriate operations may be performed by processor 132, memory 134, and/or storage media device controller 140 to perform automated backups between storage media devices 180 (e.g., storage media device 180(1) may be a backup drive to storage media device 180(n)) without requiring intervention by host device 110.

In another embodiment, appropriate operations may be performed by processor 132, memory 134, and/or storage media device controller 140 to optimize storage media device data communications between storage media devices 180. For example, external device 120 may be configured to permit copying between various storage media devices 180 without requiring intervention by host device 110. Such an arrangement may improve such copying by, for example, approximately 50% over other arrangements that may pass such storage media device data communications from storage media devices 180 to host device 110 and back to storage media devices 180 for copying.

In another embodiment, appropriate operations may be performed by processor 132, memory 134, and/or storage media device controller 140 to use faster storage media devices 180 as caches for slower storage media devices. For example, if storage media device 180(n) is implemented as a solid state drive, then storage media device 180(n) may be used as a cache for storage media device 180(1), thus improving performance.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of selectively allocating a buffer adapted to be shared for storage media device data communications and downstream device data communications routed through a hub, the method comprising:
   detecting if one or more downstream devices are connected to one or more downstream device ports of the hub; and
   if any downstream devices are detected:
      allocating a first portion of the buffer for a storage media device controller,
      allocating one or more second portions of the buffer for the detected downstream devices, wherein each of the second portions is associated with a corresponding one of the detected downstream devices, and
      passing the storage media device data communications between a host device and the storage media device controller through the first portion of the buffer and not the second portions of the buffer.

2. The method of claim 1, further comprising passing the downstream device data communications between the host device and the detected downstream devices through the second portions of the buffer and not the first portion of the buffer.

3. The method of claim 2, wherein the first portion of the buffer and at least one of the second portions of the buffer overlap with each other, the method further comprising switching between:
   using the first portion of the buffer to pass the storage media device data communications; and
   using the at least one of the second portions of the buffer to pass the downstream device data communications.

4. The method of claim 2, further comprising:
   populating a route table with device identifiers associated with the detected downstream devices; and
   routing the downstream device data communications using the route table.

5. The method of claim 1, further comprising:
   if no downstream devices are detected:
      allocating a third portion of the buffer comprising substantially all of the buffer for the storage media device controller; and
      passing the storage media device data communications between the host device and the storage media device controller through the third portion of the buffer.

6. The method of claim 1, further comprising:
   receiving a Universal Serial Bus (USB) enumeration request from the host device; and
   delaying providing a response to the USB enumeration request to register the storage media device controller with the host device until at least after the buffer has been allocated.

7. The method of claim 1, wherein the downstream device ports are Universal Serial Bus (USB) 3.0 ports and the detected downstream devices are USB 3.0 devices.

8. The method of claim 1, wherein the hub further comprises a plurality of storage media device ports adapted to interface one or more storage media devices with the storage media device controller.

9. The method of claim 8, wherein the hub is implemented in a storage media device enclosure and at least one of the storage media device ports is adapted to be connected to a storage media device in the storage media device enclosure.

10. The method of claim 8, wherein the storage media device ports are Serial Advanced Technology Attachment (SATA) ports.

11. The method of claim 8, wherein the storage media device ports are flash memory interface ports.

12. The method of claim 8, further comprising operating the storage media devices such that the host device perceives the storage media devices as a single storage media device.

13. The method of claim 8, further comprising transferring data between the storage media devices without intervention by the host device.

14. The method of claim 8, further comprising operating at least a first one of the storage media devices as a cache for at least a second one of the storage media devices.

15. The method of claim 1, wherein the storage media device controller is integrated with the hub.

16. A device comprising:
a host device port adapted to interface with a host device;
one or more downstream device ports adapted to interface with one or more downstream devices;
a storage media device controller;
a hub; and
a buffer adapted to be shared for storage media device data communications and downstream device data communications routed through the hub, wherein the hub is adapted to:
detect if one or more downstream devices are connected to the one or more downstream device ports, and
if any downstream devices are detected, allocate a first portion of the buffer for the storage media device controller, allocate one or more second portions of the buffer for the detected downstream devices, wherein each of the second portions is associated with a corresponding one of the detected downstream devices, and pass the storage media device data communications between the host device and the storage media device controller through the first portion of the buffer and not the second portions of the buffer.

17. The device of claim 16, wherein the hub is further adapted to pass the downstream device data communications between the host device and the detected downstream devices through the second portions of the buffer and not the first portion of the buffer.

18. The device of claim 17, wherein the first portion of the buffer and at least one of the second portions of the buffer overlap with each other, and wherein the hub is further adapted to switch between:
using the first portion of the buffer to pass the storage media device data communications; and
using the at least one of the second portions of the buffer to pass the downstream device data communications.

19. The device of claim 17, wherein:
the hub comprises a route table adapted to store device identifiers associated with the detected downstream devices; and
the hub is adapted to populate the route table with the device identifiers and route the downstream device data communications using the route table.

20. The device of claim 16, wherein the hub is further adapted to, if no downstream devices are detected:
allocate a third portion of the buffer comprising substantially all of the buffer for the storage media device controller; and
pass the storage media device data communications between the host device and the storage media device controller through the third portion of the buffer.

21. The device of claim 16, wherein the hub is further adapted to:
receive a Universal Serial Bus (USB) enumeration request from the host device; and
delay a response to the USB enumeration request to register the storage media device controller with the host device until at least after the buffer has been allocated.

22. The device of claim 16, wherein the downstream device ports are Universal Serial Bus (USB) 3.0 ports and the detected downstream devices are USB 3.0 devices.

23. The device of claim 16, wherein the device further comprises a plurality of storage media device ports adapted to interface one or more storage media devices with the storage media device controller.

24. The device of claim 23, wherein the device is a storage media device enclosure and at least one of the storage media device ports is adapted to be connected to a storage media device in the storage media device enclosure.

25. The device of claim 23, wherein the storage media device ports are Serial Advanced Technology Attachment (SATA) ports.

26. The device of claim 23, wherein the storage media device ports are flash memory interface ports.

27. The device of claim 23, wherein the device is adapted to operate the storage media devices such that the host device perceives the storage media devices as a single storage media device.

28. The device of claim 23, wherein the device is adapted to transfer data between the storage media devices without intervention by the host device.

29. The device of claim 23, wherein the device is adapted to operate at least a first one of the storage media devices as a cache for at least a second one of the storage media devices.

30. The device of claim 16, wherein the storage media device controller is integrated with the hub.

31. A device comprising:
a host device port adapted to interface with a host device;
one or more downstream device ports adapted to interface with one or more downstream devices;
a storage media device controller;
a buffer adapted to be shared for storage media device data communications and downstream device data communications;
means for detecting if one or more downstream devices are connected to the one or more downstream device ports;
means for allocating a first portion of the buffer for the storage media device controller;
means for allocating one or more second portions of the buffer for the detected downstream devices, wherein each of the second portions is associated with a corresponding one of the detected downstream devices, and
means for passing the storage media device data communications between a host device and the storage media device controller through the first portion of the buffer and not the second portions of the buffer.

* * * * *